(12) United States Patent
Sovio et al.

(10) Patent No.: US 9,300,472 B2
(45) Date of Patent: Mar. 29, 2016

(54) METHOD AND APPARATUS FOR IMPROVING DIGITAL SIGNATURES

(75) Inventors: Sampo Sovio, Riihimäki (FI); Martti Takala, Riihimäki (FI); Rauno Tamminen, Tampere (FI); Suvi Lehtinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 179 days.

(21) Appl. No.: 13/249,710

(22) Filed: Sep. 30, 2011

(65) Prior Publication Data

US 2013/0117569 A1 May 9, 2013

(51) Int. Cl.
| | |
|---|---|
| *H04L 9/32* | (2006.01) |
| *G06F 7/58* | (2006.01) |
| *G06F 7/72* | (2006.01) |
| *G06F 1/26* | (2006.01) |
| *G08B 13/00* | (2006.01) |
| *G08B 29/00* | (2006.01) |
| *H04N 1/44* | (2006.01) |

(52) U.S. Cl.
CPC .............. *H04L 9/3247* (2013.01); *G06F 7/582* (2013.01); *G06F 7/725* (2013.01); *H04L 9/3252* (2013.01); *H04L 2209/805* (2013.01)

(58) Field of Classification Search
CPC .......... G06F 7/582; G06F 7/25; H04L 9/3247
USPC ................. 713/168–174, 176, 182–186, 202; 709/225, 229; 726/2–8
See application file for complete search history.

(56) References Cited

U.S. PATENT DOCUMENTS

| | | | |
|---|---|---|---|
| 5,608,801 A | 3/1997 | Aiello et al. | |
| 5,732,138 A | 3/1998 | Noll et al. | |
| 6,151,676 A * | 11/2000 | Cuccia | H04L 9/3013 380/259 |
| 6,285,761 B1 | 9/2001 | Patel et al. | |
| 2001/0052075 A1* | 12/2001 | Feinberg | 713/168 |
| 2003/0086565 A1 | 5/2003 | Desai et al. | |
| 2007/0230694 A1 | 10/2007 | Rose et al. | |
| 2009/0262928 A1 | 10/2009 | Busari | |
| 2009/0287929 A1* | 11/2009 | Kolesnikov | H04L 9/0844 713/171 |
| 2010/0185867 A1* | 7/2010 | Izu et al. | 713/176 |
| 2011/0163818 A1 | 7/2011 | Dichtl et al. | |
| 2012/0069994 A1* | 3/2012 | Bertoni | H04L 9/004 380/28 |

OTHER PUBLICATIONS

Seeding srand() by Guy Rutenberg, posted Sep. 2007.*
FIPS Pub 186-3; Federal Information Processing Standards Publication; "Digital Signature Standard (DSS)"; Information Technology Laboratory; Gaithersburg, Maryland; Issued: Jun. 2009.

(Continued)

*Primary Examiner* — Evans Desrosiers
(74) *Attorney, Agent, or Firm* — Alston & Bird LLP

(57) ABSTRACT

Systems and methods are provided for enchancing pseudo random number generation to thwart various security attacks to a system that relies on digital signature security measures. For example, a random number may be bound to a message that is to be signed using a digital signature. Alternatively, a random number may be bound to a secret seed value, which may be updated subsequent to each signing. Alternatively still, a random number may be bound to both the message to be signed using a digital signature and a secret seed value.

16 Claims, 8 Drawing Sheets

(56) References Cited

OTHER PUBLICATIONS

Rukhin, A., et al.; NIST Special Publication 800-22; Revision 1a; National Institute of Standards and Technology; "A Statistical Test Suite for Random and Pseudorandom Number Generators for Cryptographic Applications"; Revised: Apr. 2010.

Non-repudiation—Wikipedia, the free encyclopedia; [Online]; [Retrieved on Jun. 28, 2011]; Retrieved from the Internet <URL: http://en.wikipedia.org/wiki/Non-repudiation>; 2 sheets.

Signing Verification; [Online]; [Retrieved on Jun. 30, 2011]; Internet <URL: http://upload.wikimedia.org/wikipedia/commons/thumb/2/2b/Digital_Signature_diagram.svg>; 1 page.

International Search Report and Written Opinion of the Searching Authority for Application No. PCT/FI2012/050807; dated Feb. 18, 2013.

Extended European Search Report for Corresponding European Application No. 12837540.9 dated Jun. 10, 2015, 7 pages.

Goh et al., *A Signature Scheme as Secure as the Diffie-Hellman Problem*, Computer Science Department, (May 2003) 15 pages.

Hwang, R. J. et al., *An efficient signcryption scheme with forward secrecy based on elliptic curve*, Applied Mathematics and Computation, vol. 167, vol. 2 (Aug. 2005) 870-881.

K.-H. So, H. et al., *Zero-configuration Identity-based Signcryption Scheme for Smart Grid*, First 2010 IEEE International Conference on, IEEE (Oct. 2010) 321-326.

Nguyen, P. et al., *The Insecurity of the Elliptic Curve Digital Signature Algorithm with Partially Known Nonces*, Designs, Codes and Crytography, (Sep. 2003) 201-217.

\* cited by examiner

METHOD AND APPARATUS FOR IMPROVING DIGITAL SIGNATURES

TECHNICAL FIELD

The present application relates generally to digital signatures utilized for authentication, non-repudiation, and integrity of signed data and, more particularly, to enhancing generated random numbers utilized in a digital signature.

BACKGROUND

Digital signatures are typically used for authentication, non-repudiation, and verifying the integrity of signed data. In particular, a digital signature refers to some mathematical scheme employing some type of cryptography (commonly asymmetric) that may be used to demonstrate that a digital message, documents, etc., is authentic. Digital signatures may also be utilized to prevent a digital "signer" from claiming that they did not sign a message/document, (at times also suggesting that their private key is still secret), (non-repudiation). Additionally, a sender and receiver of a message or document may wish to ensure that the message or document communicated therebetween has not be changed in some way (even if still encrypted), where any change in the message or document after signature will invalidate the signature (verifying integrity).

A digital signature scheme generally includes three algorithms, e.g., a key generation algorithm for randomly selecting a private key and outputting a corresponding public key. The next algorithm is a signature algorithm that, with a message/document and private key, outputs a signature. Lastly, the digital signature scheme includes a signature verification algorithm that given a message, a public key, and a signature, verifies the authenticity of the message.

Different types of cryptography may be utilized in digital signature schemes. The most widely used digital signature algorithms are Rivest, Shamir, and Adleman (RSA) and Elliptic Curve-based digital signature algorithm (ECDSA). ECDSA is commonly used in many industry applications, for example, in digital rights management (DRM) solutions utilized in, e.g., smart phones, gaming consoles, various Internet Engineering Task Force (IETF) standards, National Security Agencys (NSA) Suite-B cryptographic algorithms, etc.

One example of the use of ECDSA is in the context of DRM-protected content from a digital application/media store, e.g., commercial content, which typically has copyright protection. In order to obtain access to such protected content, a device requesting the protected content creates a license request, which is signed using ECDSA. The ECDSA signature is required to guarantee that the store can verify that the device that originated the license request is a DRM-compliant device. After receipt of a valid license request, the store may return a license response to the verified device containing instructions regarding how to access the protected content, including encrypted content-specific keys. The returned DRM license is also ECDSA signed, so that DRM-compliant device is able to verify that the originator of the license (in this case the store) is also a valid and accepted party.

The security of an ECDSA algorithm relies on the quality of the pseudo random numbers used, and conventional systems rely on instructing implementers to use "decent" quality random numbers. In fact, good quality pseudo random numbers are typically considered to be a vital starting point for secure cryptographic implementations. The idea behind random number generation is, typically, that a hardware platform can collect a certain amount of entropy, for example, from electromagnetic properties of a device, temperature, key strokes from a user, etc. This entropy is then used as a source of randomness, where generally, a relatively short and truly random seed can be extracted from the entropy. Alternatively, it is possible to derive more random data from a relatively short random seed value by using a well-designed Pseudo Random Generator (PRNG). However the device may be limited in its capabilities, and thus may not produce decent/sufficient quality random numbers. Additionally, there might be an implementation bug either in the software or hardware, which may cause random numbers to be generated that lack the requisite quality in terms of achieving security. In fact, and in very limited devices, there might only be a fixed secret seed value for the PRNG.

SUMMARY

Various aspects of examples of the invention are set out in the claims.

According to a first aspect, a method comprises selecting a random number (rand); enhancing the rand; and utilizing a digital signature algorithm based at least in part, upon the enhanced random number (rand1), for signing at least one of a message or document transceived by at least one device.

According to a second aspect, a computer-readable memory includes computer executable instructions, the computer executable instructions, which when executed by a processor, cause an apparatus to: select a random number (rand); enhance the rand; and utilize a digital signature algorithm based at least in part, upon the enhanced random number (rand1), for signing at least one of a message or document transceived by the apparatus.

According to a third aspect, an apparatus comprises at least one processor and at least one memory. The at least one memory includes computer program code, the at least one memory and the computer program code configured to, with the at least one processor, cause the apparatus to perform at least the following: select a random number (rand); enhance the rand; and utilize a digital signature algorithm based at least in part, upon the enhanced random number (rand1), for signing at least one of a message or document transceived by the apparatus.

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

Example embodiments and their potential advantages are understood by referring to FIGS. 1-8 of the drawings.

Various embodiments are directed to enchancing pseudo random number generation to thwart various security attacks to a system that relies on digital signature security measures. As discussed previously, ECDSA is a type of digital signature algorithm that utilizes elliptic curve cryptography. Example parameters for an ECDSA system over prime field scenario are discussed herein. However, it should be noted that other types of curve parameters exist, where coefficients of the curve and point coordinates are in some extension field of a prime field.

Examples of parameters from characteristic two and prime fields can be found in the "Digital Signature Standard (DSS)," FIPS PUB 186-3, located on the National Institute of Standards and Technology webpage. Various embodiments are contemplated to cover these extension field cases.

In one example, the ECDSA includes, at a minimum, the following parameters: E, G, p, N, Pub, Priv, M and S. E refers to an equation of the elliptic curve in form $y^2=x^3+ax+b$, where a and b are coefficient in a prime field. G is the base point of the curve, and p is a prime number that defines the prime field mod p. N is the order of the curve, i.e., number of points (x,y), which satisfies the above curve equation and the coordinates in prime field. Priv refers to a random number from interval 0<Priv<n that acts as the private key. Pub=Priv*G is the public key. M is the message that will be signed, and S is the signature of the message.

One known type of attack may involve exploiting the use of the same random numbers in ECDSA signatures. For example, a hacker may notice that a particular gaming console, such as a Sony® Playstation 3® (PS3™), utilizes different ECDSA signatures that are generated by using the same random number. Such a flaw in ECDSA signature-based security is easily detectable because an attacker may simply notice upon receiving signatures of two messages, that the signatures are created by using the same random number. In this instance, the signature is a pair of byte strings S=(r,s). If the random number is the same in more than one message, the r-components are the same in those signatures. The converse is also true, where if the r-components are the same, it is very likely that the random numbers are the same. In this case, hackers may notice that different signatures contain the same r-component, which is a very strong indication of this sort of vulnerability.

Figure 1:
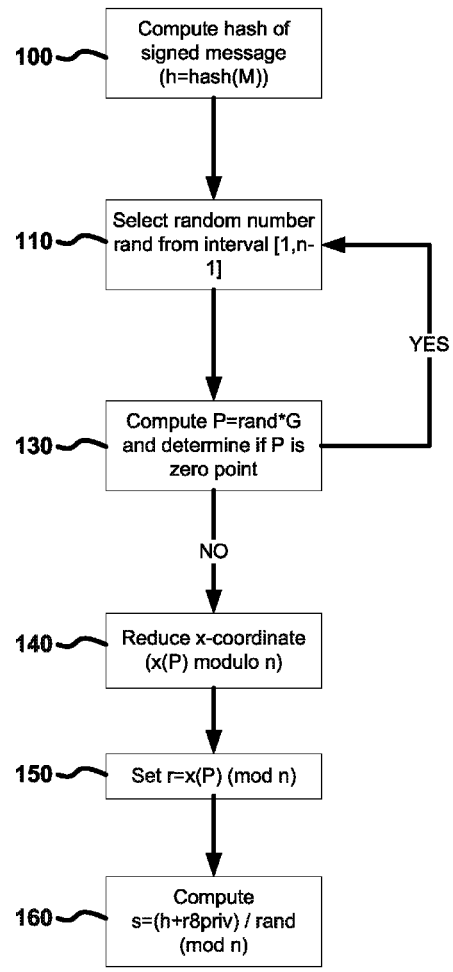
FIG. 1 is a flow chart illustrating conventional processes performed for creating a digital signature.

FIG. 1 illustrates processes performed for ECDSA signature creation as specified in the DSS. At 100, a hash of the signed message is computed, i.e., h=hash(M). At 110, a random number "rand" is selected from the interval [1,n−1]. At 130, a point number P is computed using the formula P=rand*G, where again, G is the base point of the curve. Additionally, it is determined whether P is a zero point. If P is a zero point, the process returns to 110, and another random number rand is selected. If it is determined that P is not a zero point, the process continues to 140, where the x-coordinate is reduced, i.e., x(P) modulo n. At 150, the r-component is set, i.e., r=x(P) (mod n). At 160, the s-component is computed using the formula s=(h+r*priv)/rand (mod n).

Referring to the above-described scenario, where two signatures S1 and S2 have the same r-component values, i.e, the signatures are in the form S1=(r,s1) and S2=(r,s2), the following pair of linear equations results.

$(h1+r*priv)/\text{rand}=s1 (\text{mod } n)$ $(h2+r*priv)/\text{rand}=s2 (\text{mod } n)$ From the pair of equations, a private key priv results from the following equation, where the random number rand may be eliminated.

$\text{priv}=(s1(h1-h2)/(r1-r2)-h1)/r (\text{mod } n)$

In addition, the above-described security flaw, various embodiments also address scenarios where an attacker may be able to predict the random number that an ECDSA algorithm would generate. It should be noted that such a problem would be even more severe, because if the random number rand is known, the attacker can simply compute the r-component value and subsequently calculate the private key priv from a single signature, i.e., priv=(s*rand−h)/r.

Yet another potential security flaw addressed by various embodiments involves non-repudiation, which is a typical scenario in man-in-the-middle-attacks as previously described above. In non-repudiation scenarios, problems with ECDSA signatures arise if the same message will produce the same signature. If this is the case, an eavesdropper may replay the signature of the valid party.

Various embodiments address ECDSA signature security flaws by enhancing the generated random number so that attacks, such as those described previously, are rendered useless. In particular, and in accordance with a first embodiment, a generated random number is bound to the message M that will be signed with an ECDSA signature. Accordingly, every r-component of the ECDSA signature will be different for every different message. Therefore, the above-described pair of equations is modified to the following form, where it becomes impossible to eliminate both random numbers rand1 and rand2.

$(h1+r*priv)/\text{rand}1=s1 (\text{mod } n)$ $(h2+r*priv)/\text{rand}2=s2 (\text{mod } n)$ In accordance with a second embodiment, the generated random number may be bound with a secret seed value. The seed value (or a derivative thereof) is available only when utilizing an ECDSA algorithm. Binding the random number with a secret seed value in accordance with this embodiment protects against an attack based upon predicting the random numbers that an ECDSA function will generate. This, the random numbers cannot be predicted because the random numbers are outputs of a one-way function of the secret seed value and some other diversifier. Therefore, even if an attack somehow causes damage to the PRNG service, and can predict the output of the PRNG outside of an ECDSA function, the random number that will generated inside ECDSA function still cannot be predicted. In the event that random number prediction is prohibited as already described, but the same random number is utilized for more than a single signature, a third embodiment may be utilized, where the generated random number is bound to both the message M that will be signed, as well as to a secret seed value.

In accordance with a fourth embodiment, the aforementioned secret seed value, to which a random number may be bound, can be updated after every signing ECDSA operation. Such an update process in accordance with this embodiment makes the seed values a monotonically increasing or decreasing sequence using some form of monotonic function, where the seed is stored in non-volatile memory. Storage of the seed/seed value is required so that a given order of the seed values can be preserved/maintained to allow for the monotonically increasing/decreasing sequence.

Figure 2:
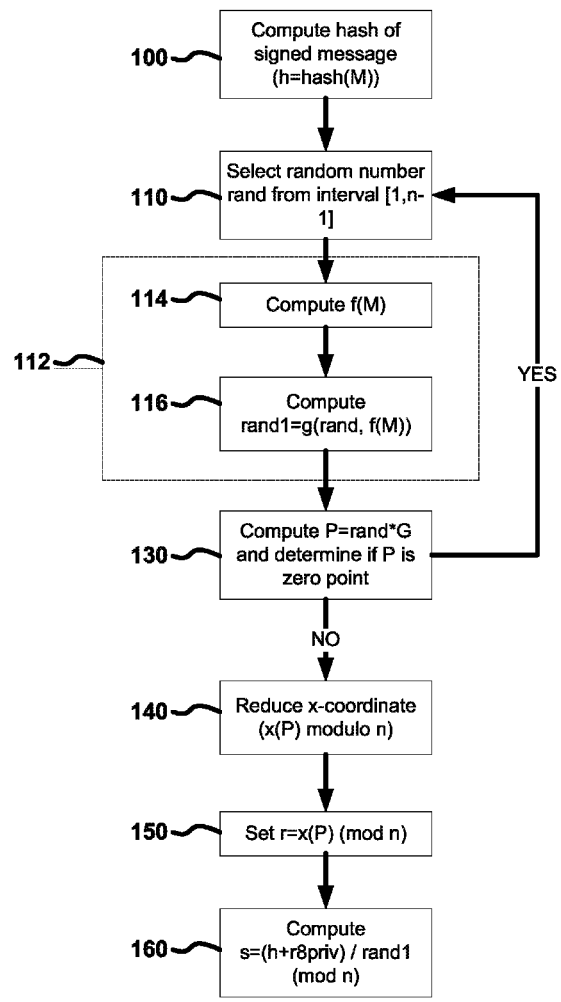
FIG. 2 is a flow chart illustrating exemplary processes performed in accordance with one embodiment to create a digital signature based upon binding a random number with a message to be signed.

FIG. 2 illustrates exemplary processes for generating an ECDSA signature in accordance with the first embodiment described above, where the random number is enhanced by binding the random number to the message that is to be signed with the ECDSA signature. As previously described in FIG. 1, at 100, a hash of the signed message is computed, i.e., h=hash(M). At 110, a random number "rand" is selected from the interval [1,n−1]. At 112, the random number is enhanced. The enhancement to the random number in accordance with this first embodiment includes, computing at 114, the function f(M), where f may be a one-way function (i.e., the output(s) does not reveal input(s)), and M is the message to be signed. It should be noted that the function f need not necessarily be a one-way function. For example, and if g is a KDF (as described in detail below) function, f(M)=M. The enhancement further includes, at 116, computing the enhanced random number rand1 using the formula, rand1=g (rand, f(M)), where g is also a one-way function. Thereafter, and again returning to the processes described and illustrated in FIG. 1, the computation of point P (in this instance with rand1) at 130, the x-coordinate is reduced at 140, the r-component is set at 150, and the signature s is computed at 160 (again, utilizing rand1 in place of the previously selected rand).

Figure 3:
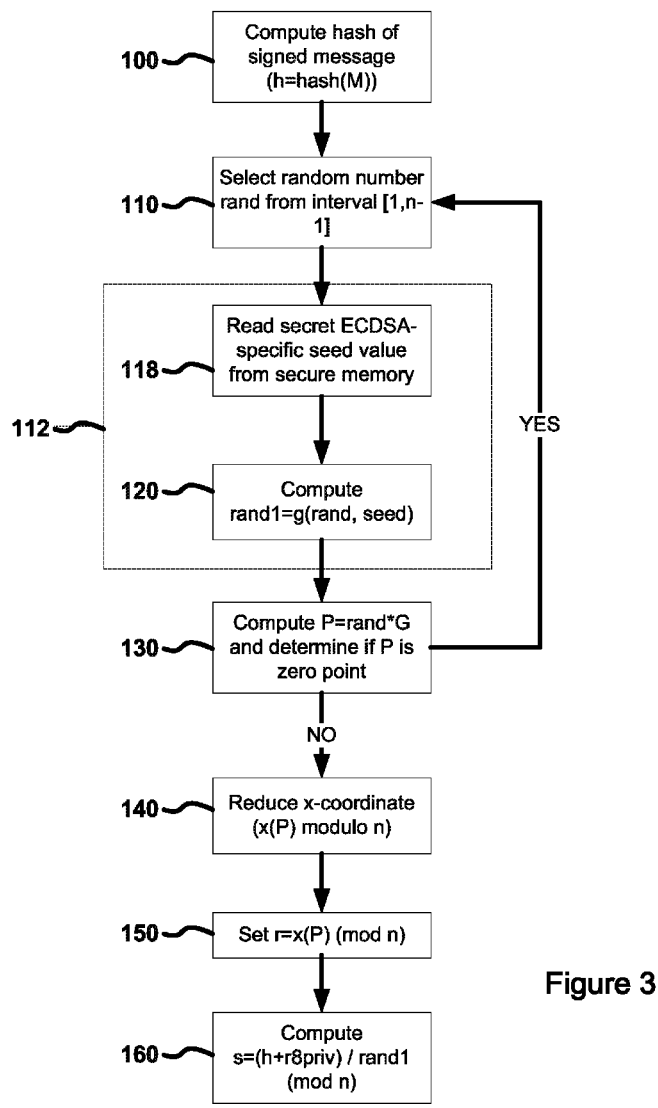
FIG. 3 is a flow chart illustrating exemplary processes performed in accordance with one embodiment to create a digital signature based upon binding a random number with a secret seed value.

FIG. 3 illustrates exemplary processes performed in accordance with the second embodiment, where the random number is enhanced by binding the random number to a secret (ECDSA-specific) seed value. As before, at 100, a hash of the signed message is computed, i.e., h=hash(M), and at 110, a random number "rand" is selected from the interval [1,n−1]. At 112, the selected random number is enhanced. The enhancement in accordance with this second embodiment includes at 118, reading a secret ECDSA-specific seed value from some secure memory. At 120, the enhancement further includes computing an enhanced random number rand1 per the following equation, rand1=g(rand, seed). Thereafter, and again returning to the processes described and illustrated in FIG. 1, the computation of point P (in this instance with rand1) at 130, the x-coordinate is reduced at 140, the r-component is set at 150, and the signature s is computed at 160 (again, utilizing rand1 in place of the previously selected rand).

Figure 4:
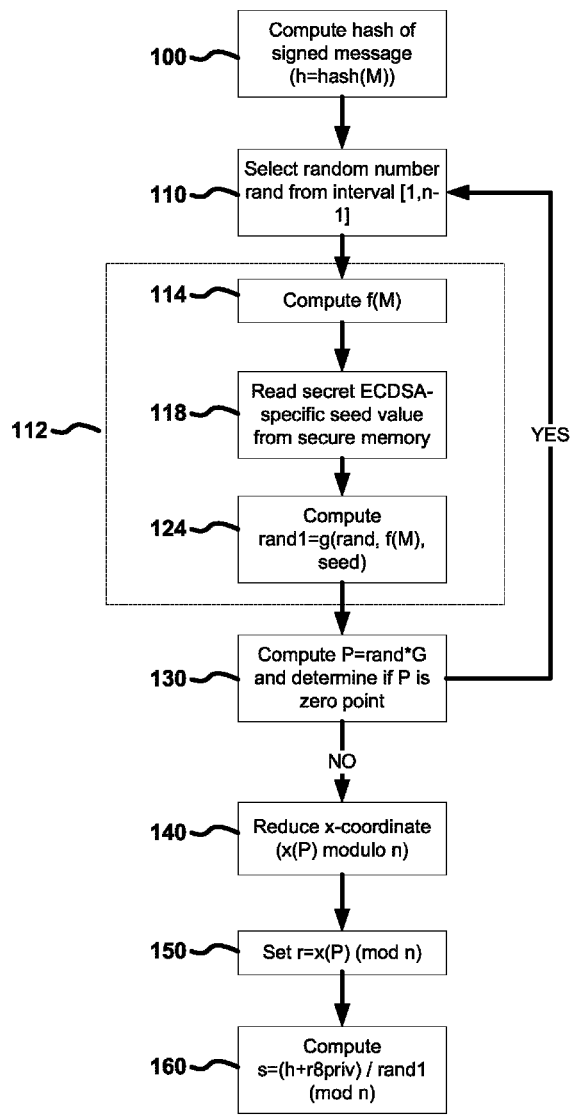
FIG. 4 is a flow chart illustrating exemplary processes performed in accordance with one embodiment to create a digital signature based upon binding a random number with both a message to be signed and a secret seed value.

FIG. 4 illustrates exemplary processes performed in accordance with the third embodiment, where the random number is bound to both the message M to be signed, as well as to a secret seed value. At 100, a hash of the signed message is computed, i.e., h=hash(M), and at 110, a random number "rand" is selected from the interval [1,n−1]. At 112, the selected random number is enhanced. In this third embodiment, the enhancement includes, at 114, computing the function f(M). The enhancement also includes, at 118, reading a secret ECDSA-specific seed value from some secure memory. Lastly, the enhancement includes, at 124, computing an enhanced random number rand1 per the following equation, rand1=g(rand, f(M), seed). Thereafter, and again returning to the processes described and illustrated in FIG. 1, the computation of point P (in this instance with rand1) at 130, the x-coordinate is reduced at 140, the r-component is set at 150, and the signature s is computed at 160 (again, utilizing rand1 in place of the previously selected rand).

Figure 5:
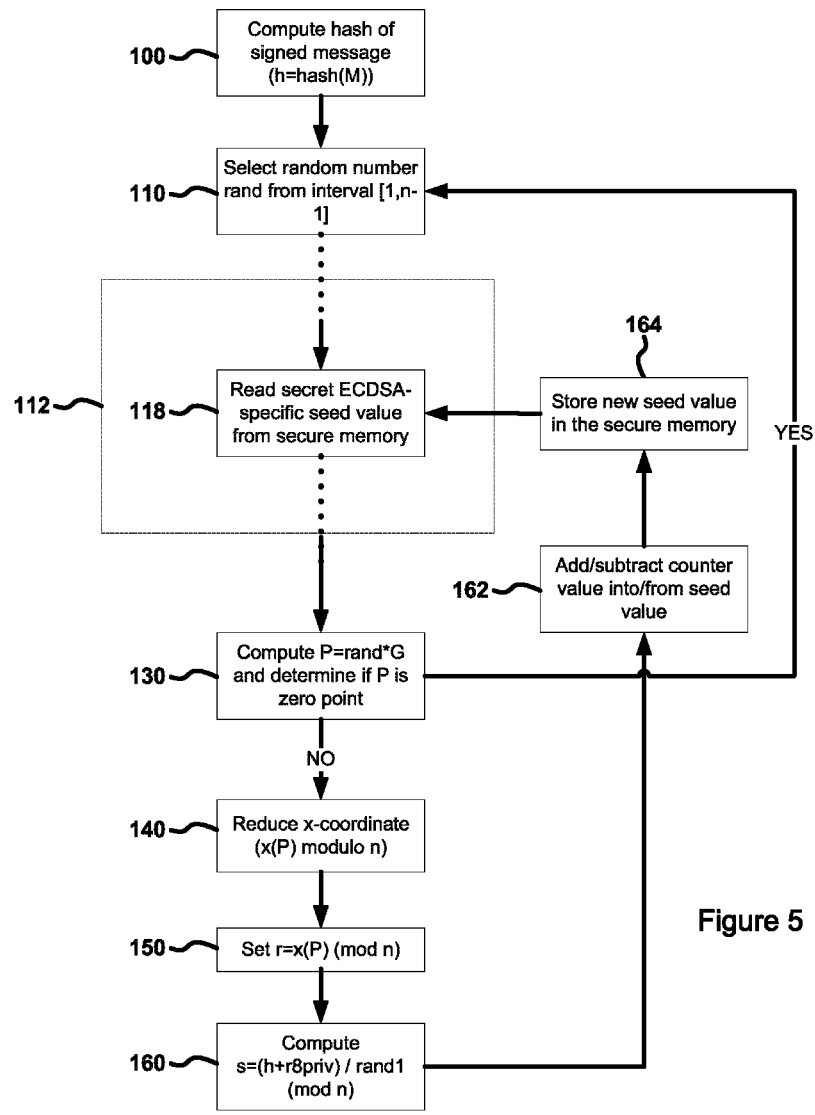
FIG. 5 is a flow chart illustrating exemplary processes performed in accordance with one embodiment to create a digital signature based upon binding a random number with at least an updating secret seed value.

FIG. 5 illustrates exemplary processes performed in accordance with the fourth embodiment, where the ECDSA-specific secret seed value is updated after each signing ECDSA operation. As previously described, a hash of the signed message is computed at 100, i.e., h=hash(M), and at 110, a random number "rand" is selected from the interval [1,n−1]. As previously described, the random number may be enhanced in accordance with various embodiments at 112. Regardless of whether the random number is to be bound to the seed value, or to both the seed value and the message M, at 118, the secret ECDSA-specific seed value is read from secure memory. The processes continue as previously described, where the computation of point P (in this instance with a resulting enhanced random number rand1) at 130, the x-coordinate is reduced at 140, the r-component is set at 150, and the signature s is computed at 160 (utilizing rand1 in place of the previously selected rand). At 162, and subsequent computing/signing a message or document, a counter value is added into the seed value at 162 (or in the case of a decreasing sequence, a counter value is subtracted from the seed value). It should be noted that the counter value may be implemented in a cyclical manner, i.e., when the counter value reaches a "maximum value," the next counter value that, e.g., may be added is a minimum value, such as "0." When the counter value is at its minimum value, and it is, e.g., decreased, the next counter value will be set at the maximum value, such as $2^{64}-1$. At 164, the new seed value resulting from the added/subtracted counter value is stored in the secure memory. Thus, upon a new signature being created, at 118, the retrieval of the secret ECDSA-specific seed value will be the new seed value stored in the secure memory.

It should be noted that a variety of one-way functions might be used, including but not limited to the following functions: hash functions; keyed-hash functions; PRNG functions; key derivation functions; or any combination of such one-way functions. A concrete example of a g-function could be g(rand,f(M),seed)=KDF(rand|f(M)|seed, length), where "|" refers to concatenation, "KDF" refers to a key derivation function, such as an American National Standards Institute (ANSI)-KDF, and "length" refers to an intended length of the rand1.

It should be noted that the processes performed in the aforementioned embodiments might include more or less processes. It should also be noted that the particular order in which certain processes are performed might be altered in accordance with still other embodiments contemplated herein.

Figure 6:
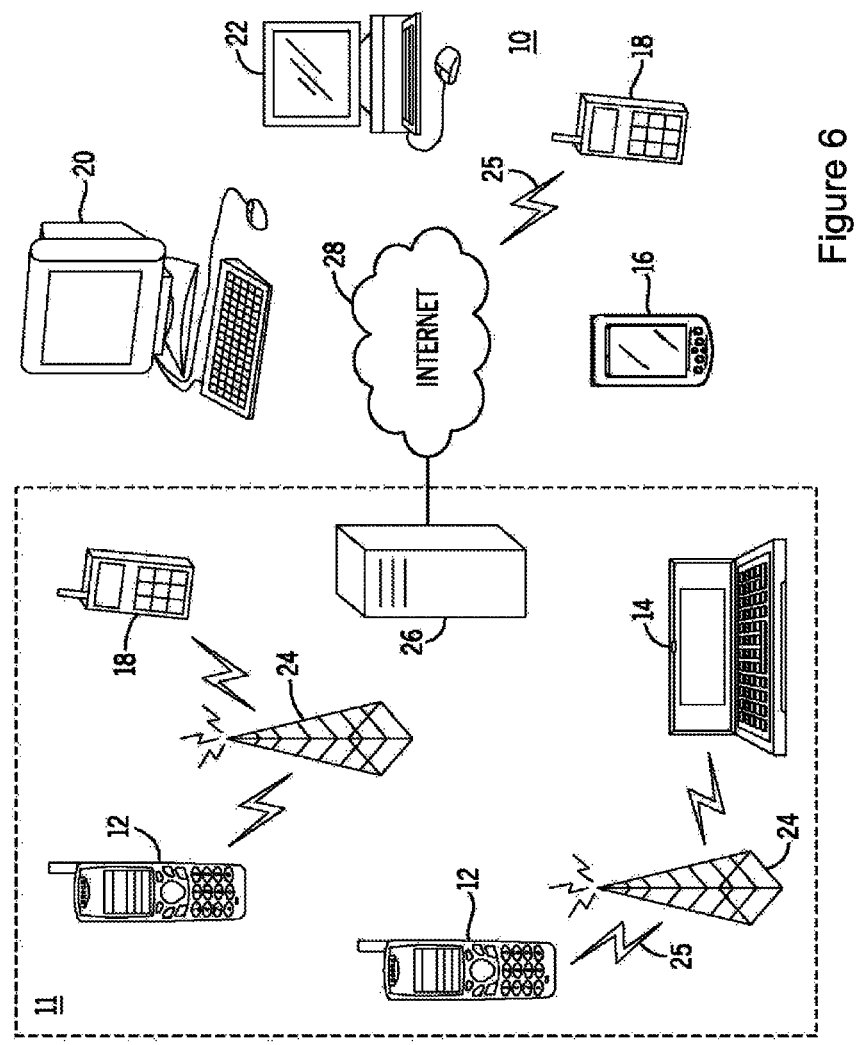
FIG. 6 is an overview diagram of a system within which various embodiments may be implemented.

FIG. 6 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 6 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic user device 12, in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 7:
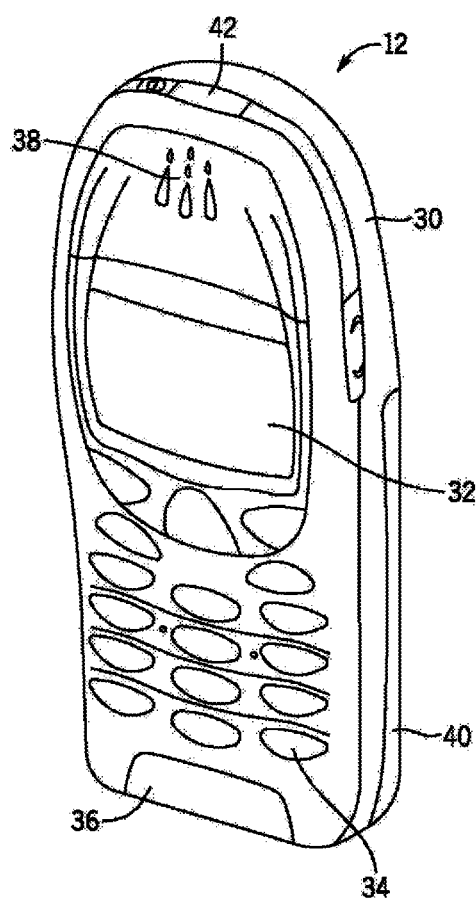
FIG. 7 is a perspective view of an electronic device that can be used in conjunction with the implementation of various embodiments.
Figure 8:
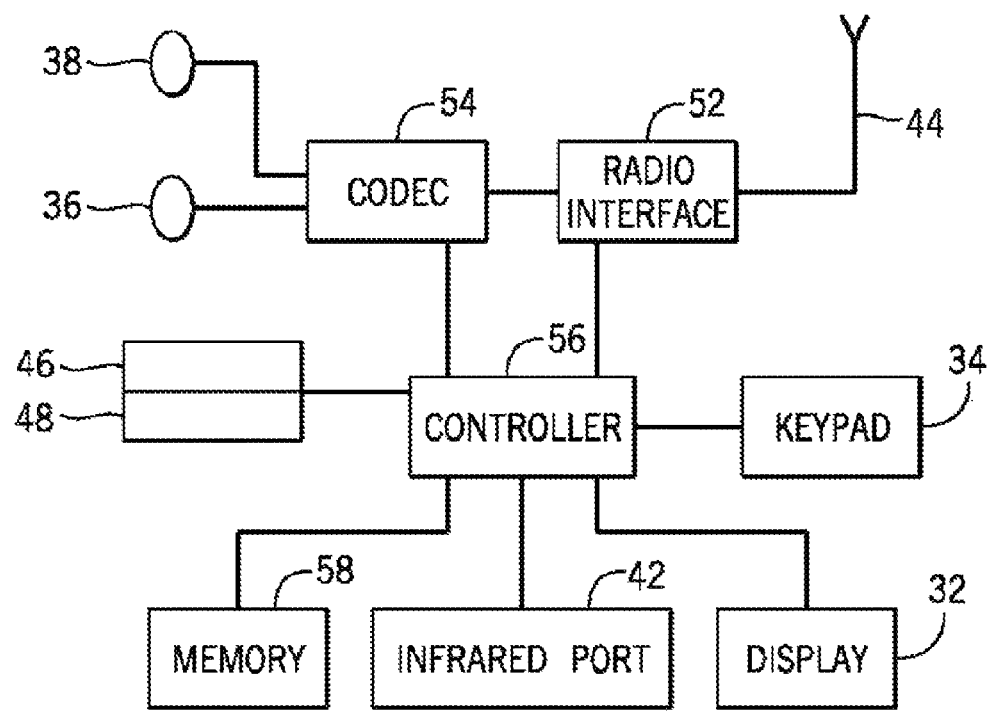
FIG. 8 is a schematic representation of the circuitry which may be included in an exemplary electronic device which may be utilized in accordance with various embodiments.

FIGS. 7 and 8 show one representative electronic device 12 within which the present invention may be implemented, where the device can detect a memory tag as described previously, and provide sensory feedback to a user in accordance with various embodiments. It should be understood, however, that the present invention is not intended to be limited to one particular type of device. The electronic device 12 of FIGS. 7 and 8 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller/processor 56 and a memory 58. The above-described components enable the electronic device to send/receive various messages to/from other devices that may reside on a network in accordance with the various embodiments of the present invention. It should be noted that the controller/processor 56 and/or another processor along with related circuitry/elements may be utilized to effectuate various embodiments by detecting NFC tags and executing program code/parameters to generate sensory feedback. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions, which, when executed by a processor, cause an apparatus to perform the methods and processes described herein.

Embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. A method, comprising:
  selecting a random number (rand);
  enhancing the rand,
  wherein the enhancing of the rand comprises binding the rand with the at least one of the message or document and with a secret seed value (seed),
  wherein the binding comprises:
  computing a function relative to the at least one of the message or document, the function being represented by the following formula: f(M); and
  computing the rand1, the rand1 being represented by the following formula: rand1=g(rand, f(M), seed), wherein g comprises a one-way function, or
  reading the seed from a secure memory unit; and computing the rand1, the rand1 being represented by the following formula: rand1=g(rand, seed), wherein g comprises a one-way function; and deriving a digital signature based at least in part, upon the enhanced random number (rand1), for signing at least one of a message or document transceived by at least one device, the enhanced random number utilized in setting an r-component of the digital signature such that the r-component of the digital signature is different than each of one or more other r-components of each of one or more other digital signatures.

2. The method of claim 1, wherein the enhancing of the rand comprises binding the rand with the at least one of the message or document.

3. The method of claim 2, wherein the binding comprises:
computing a function relative to the at least one of the message or document, the function being represented by the following formula: f(M); and
computing the rand1, the rand1 being represented by the following formula: rand1=g(rand, f(M)), wherein g comprises a one-way function.

4. The method of claim 1, wherein the enhancing of the rand comprises binding the rand with a secret seed value (seed).

5. The method of claim 4, wherein the binding comprises:
reading the seed from a secure memory unit; and
computing the rand1, the rand1 being represented by the following formula: rand1=g(rand, seed), wherein g comprises a one-way function.

6. The method of claim 1, wherein the enhancing of the rand comprises binding the rand with at least a secret seed value (seed), the seed being updated subsequent to the signing of the at least one of the message or document.

7. The method of claim 6, further comprising:
adding a counter value into the seed; and
storing a new seed in a memory unit.

8. A non-transitory computer-readable medium including computer executable instructions stored thereon, the computer executable instructions, which when executed by a processor, cause an apparatus to:
select a random number (rand);
enhance the rand,
wherein causing the apparatus to perform the enhancing of the rand further comprises computer executable instructions, which when executed by a processor, cause an apparatus to bind the rand with the at least one of the message or document and with a secret seed value (seed),
wherein causing the apparatus to bind further computer executable instructions, which when executed by a processor, cause an apparatus to:
compute a function relative to the at least one of the message or document, the function being represented by the following formula: f(M); and
compute the rand1, the rand1 being represented by the following formula: rand1=g(rand, f(M), seed), wherein g comprises a one-way function, or
read the seed from a secure memory unit; and
compute the rand1, the rand1 being represented by the following formula: rand1=g(rand, seed), wherein g comprises a one-way function; and
derive a digital signature based at least in part, upon the enhanced random number (rand1), for signing at least one of a message or document transceived by the apparatus,
the enhanced random number utilized in setting an r-component of the digital signature such that the r-component of the digital signature is different than each of one or more other r-components of each of one or more other digital signatures.

9. An apparatus, comprising:
at least one processor, and
at least one memory including computer program code, the at least one memory and the computer program code configured to, with the at least one processor, cause the apparatus to perform at least the following:
select a random number (rand);
enhance the rand,
wherein causing the apparatus to perform the enhancing of the rand comprises the at least one memory, the computer program code, and the at least one processor to cause the apparatus to bind the rand with the at least one of the message or document and with a secret seed value (seed),
wherein causing the apparatus to bind comprises the at least one memory, the computer program code, and the at least one processor causing the apparatus to:
compute a function relative to the at least one of the message or document, the function being represented by the following formula: f(M); and
compute the rand1, the rand1 being represented by the following formula: rand1=g(rand, f(M), seed), wherein g comprises a one-way function, or
read the seed from a secure memory unit; and
compute the rand1, the rand1 being represented by the following formula: rand1=g(rand, seed), wherein g comprises a one-way function; and
derive a digital signature based at least in part, upon the enhanced random number (rand1), for signing at least one of a message or document transceived by the apparatus,
the enhanced random number utilized in setting an r-component of the digital signature such that the r-component of the digital signature is different than each of one or more other r-components of each of one or more other digital signatures.

10. The apparatus of claim 9, wherein causing the apparatus to perform the enhancing of the rand comprises the at least one memory, the computer program code, and the at least one processor causing the apparatus to bind the rand with the at least one of the message or document.

11. The apparatus of claim 10, wherein causing the apparatus to bind comprises the at least one memory, the computer program code, and the at least one processor causing the apparatus to:
compute a function relative to the at least one of the message or document, the function being represented by the following formula: f(M); and
compute the rand1, the rand1 being represented by the following formula: rand1=g(rand, f(M)), wherein g comprises a one-way function.

12. The apparatus of claim 9, wherein causing the apparatus to perform the enhancing of the rand comprises the at least one memory, the computer program code, and the at least one processor causing the apparatus to bind the rand with a secret seed value (seed).

13. The apparatus of claim 12, wherein causing the apparatus to bind comprises the at least one memory, the computer program code, and the at least one processor causing the apparatus to:

read the seed from a secure memory unit; and compute the rand1, the rand1 being represented by the following formula: rand1=g(rand, seed), wherein g comprises a one-way function.

14. The apparatus of claim 9, wherein causing the apparatus to perform the enhancing of the rand comprises the at least one memory, the computer program code, and the at least one processor causing the apparatus to bind the rand with at least a secret seed value (seed), the seed being updated subsequent to the signing of the at least one of the message or document.

15. The apparatus of claim 14, wherein the at least one memory, the computer program code, and the at least one processor further cause the apparatus to:

add a counter value into the seed; and store a new seed in a memory unit.

16. The apparatus of claim 9, wherein the digital signature comprises an elliptic curve digital signature.

\* \* \* \* \*